March 31, 1959
M. ANTONEVICH
2,880,381
STOP MOTIONS
Filed March 5, 1953
2 Sheets-Sheet 1
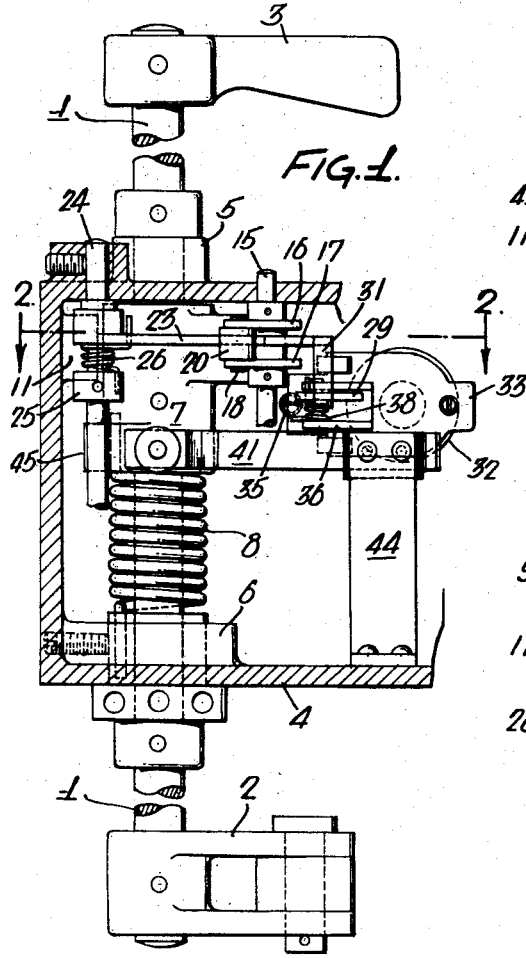
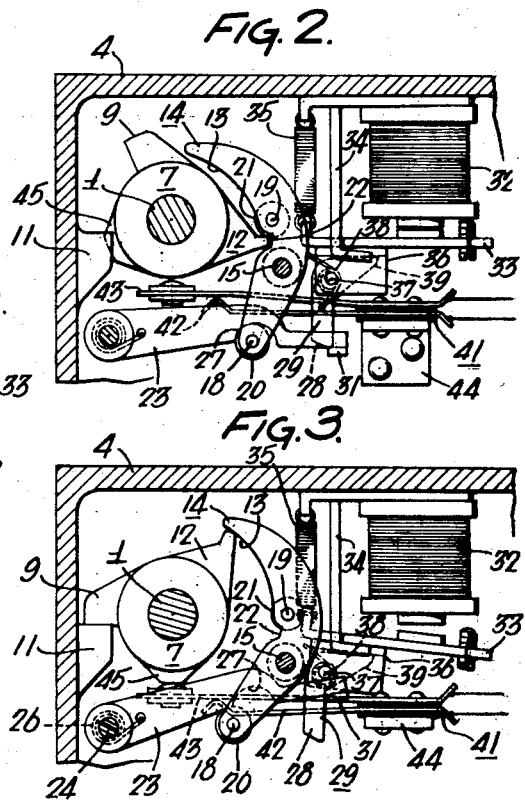
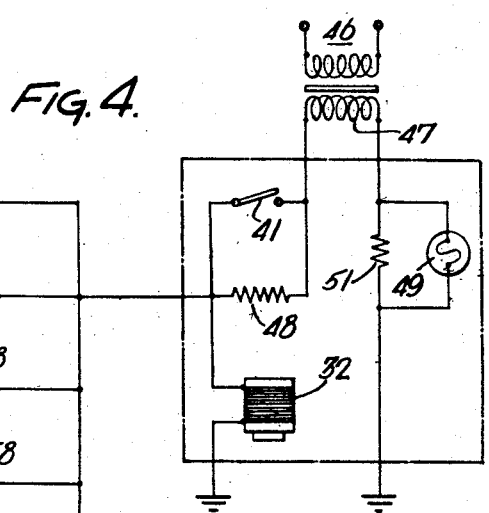
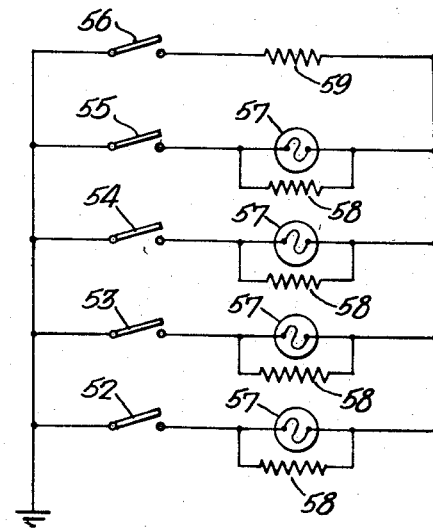
Inventor:
Michael Antonevich
by his Attorneys
Howson & Howson March 31, 1959  M. ANTONEVICH  2,880,381
STOP MOTIONS
Filed March 5, 1953  2 Sheets-Sheet 2
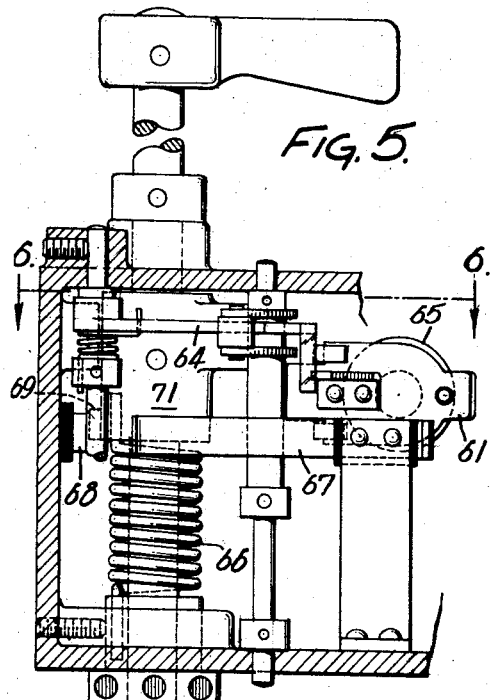
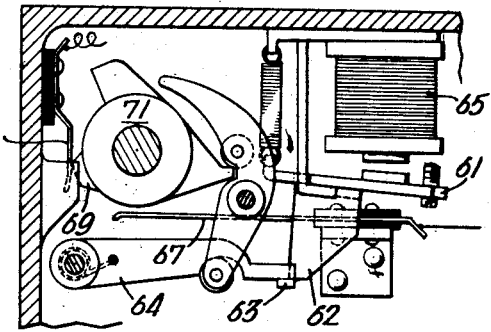
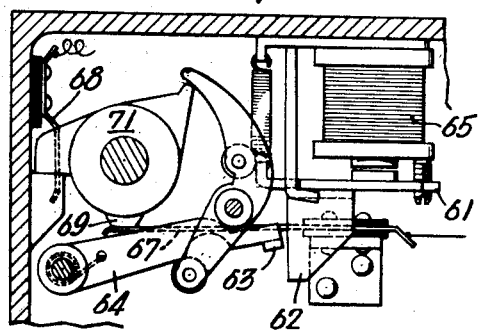
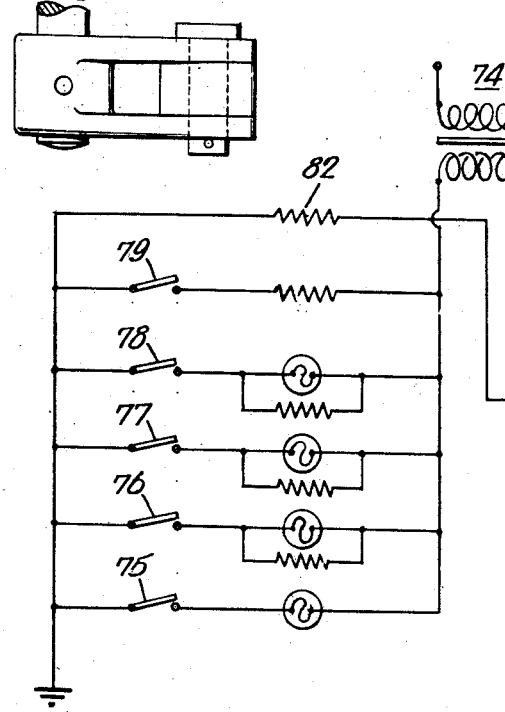
Inventor:
Michael Antonevich
by his Attorneys
Howson & Howson

United States Patent Office 2,880,381
Patented Mar. 31, 1959

2,880,381
STOP MOTIONS

Michael Antonevich, New Brunswick, N.J., assignor to The Crawford Manufacturing Company, Inc., New Brunswick, N.J., a corporation of New Jersey Application March 5, 1953, Serial No. 340,526

1 Claim. (Cl. 317—157)

This invention relates to stop motions of the general type disclosed in my prior U.S. Patent 2,488,614, and a principal object of the present invention is to provide a knock-off device of improved characteristics and a control circuit for said device combining relative simplicity of form and efficiency of operation.

The invention will be more readily understood by reference to the attached drawings wherein:

Figure 1 is a vertical sectional view of a knock-off unit made in accordance with the invention;

Figure 2 is a sectional view on the line 2—2, Figure 1, showing the mechanism in the set or operation condition;

Figure 3 is a similar sectional view showing the mechanism in the tripped condition;

Figure 4 is a diagram illustrating the electric control system for the unit shown in the preceding figures;

Figure 5 is a sectional view similar to Figure 1 showing a modified form of knock-off unit within the scope of the invention;

Figure 6 is a sectional view on the line 6—6, Figure 5, showing the mechanism in the set or operative condition;

Figure 7 is a sectional view similar to Figure 6 illustrating the mechanism in the tripped state, and Figure 8 is a diagram of the electric control system for the unit illustrated in Figures 5, 6 and 7.

With reference to Figures 1, 2 and 3 the knock-off unit therein illustrated comprises a primary knock-off shaft 1 which may be connected in conventional manner to the mechanism of a knitting machine by way, for example, of an arm 2 at the lower end of the shaft. The upper end of the shaft carries a conventional reset lever 3. As best shown in Figure 1 the shaft intersects a box 4 which contains the knock-off mechanism and is journaled in bosses 5 and 6 on the top and bottom walls respectively of the box. Attached to the shaft inside the box is a collar 7. A coil spring 8 embraces the shaft below the collar and has its upper end secured to the latter, the lower end of the spring being anchored in the fixed structure of the box. This spring functions as hereinafter described to actuate the shaft when the mechanism is tripped to interrupt the operation of the knitting machine in well known manner. The collar 7 has a radially projecting lug 9 which by engagement with a stop shoulder 11 on the box limits rotation of the shaft in the counter clockwise direction, as viewed in Figure 3, under pressure of the spring 8.

The collar 7 has a radially projecting arm 12 which operatively engages the inner arcuate face 13 of a lever 14 which is pivotally mounted in the box upon shaft 15. In the present instance the lever 14 consists of two plate elements 16 and 17, see Figure 1, which are relatively spaced axially of the supporting shaft 15 and which are connected together at one end by a pin 18 and, intermediate the ends, by a second pin 19. Each of these pins carries a freely rotatable roller, 20 and 21 respectively.

When the knock-off mechanism is in the tripped state, as shown in Figure 3, the outer end of the radial arm 12 of the collar 7 engages the extremity of the curved surface 13 of the lever 14. When the shaft 1 and collar 7 are turned in the clockwise direction from this position the outer end of the arm 12 rides upon the surface 13 as a cam and causes a pivotal movement of the lever 14 about the pin 15 in a clockwise direction. This movement continues until the outer end of the arm 12 lodges in a recess 22 in the side of the lever 14, such lodgement interrupting the movement of the collar and also permitting the lever 14 to move to a limited extent in the reverse or clockwise direction.

During the aforesaid clockwise movement of the lever 14, the roller 20 on the end of the lever lies in contact with an edge of a lever 23 which is pivotally mounted upon a pin 24 secured in the box. This pin 24, see Figure 1, carries a collar 25 to which is connected one end of a coiled spring 26, the other end of this spring engaging lever 23 and resiliently pressing this lever against the roller 20 of the lever 14, as shown in Figure 3. It will be apparent also that the spring 26 through the lever 23 and the roller 20 exerts pressure on the lever 14 tending to move that lever about the pivot pin 15 and in contact with the outer end of the arm 12 of the collar 7. When the outer end of the latter arm enters the recess 22 of the lever 14 the said lever will move in the counter clockwise direction to an extent permitting the roller 20 to enter a recess 27 in the side of the lever 23 so that this lever may move through a small angle in the counter clockwise direction from the position in which it is shown in Figure 2. In this latter position one arm 28 of a pivoted latch element 29, hereinafter described in detail, passes behind a flange 31 on the end of the lever 23 and locks this lever in position against the tendency of the spring 8, acting through the shaft 1, the collar 7, and the lever 14, to turn the lever 23 in the counter clockwise direction, and thereby locks the elements of the mechanism in the positions in which they are shown in Figure 2. This represents the normal operative condition of the knock-off device from which it may be released by retraction of the latch 28, as hereinafter described, to then permit the spring 8 to actuate the knock-off to interrupt the operation of the knitting machine.

Mounted in the box 4 is an electro-magnet 32, and operatively associated with this magnet in conventional manner is an armature 33, the armature being pivotally supported on a bracket 34 and having attached to its rearward end a coil spring 35 which tends to retain the armature in a retracted position with respect to the magnet, as illustrated in Figure 3. The lever 29 is pivotally mounted on a bracket 36 on the armature 33 through the medium of a pin 37. The lever 29 has a second arm 39 which normally seats against the proximate face of the bracket 36, and a coil spring 38 on the pin 37 and connected with the lever 29 exerts light pressure tending to hold the lever in the seated position as shown in Figure 3. It is evident by reference to this figure that when the armature 33 is drawn laterally against the magnet 32 when the latter is energized, the edge of the arm 28 of the latch lever 29 will engage the proximate edge of the flange 31 of that lever so that the lever will be turned through a small angle in the clockwise directions, as viewed in Figure 3, and will be held by the spring 38 in secure engagement with flange 31. When, therefore, the mechanism is reset, as described above, and the arm 23 has moved clockwise to the full extent permitted by the entrance of the roller 20 into the recess 27 the flange 31 will just clear the outer end of the arm 28 and will permit the spring 38 to move that arm into position behind the flange, as shown in Figure 2, to thereby lock the elements in the set position. The elements will be retained in this position until the magnet 32 is de-energized at which time the armature 33 will be displaced by the spring 35 and will withdraw the arm 28 from behind the flange 31.

Mounted within the box is an electric switch indicated generally by the reference numeral 41. This switch consists of two resilient arms 42 and 43 respectively, which are supported in proximity to each other. In the present instance both arms are supported in a base member 44 in which they are separated by suitable insulating material. The outer end of the arm 43 is positioned in operative relation to a projecting lug 45 on the collar 7 so that when the collar is in the position shown in Figure 3 the lug will function to press the arm into contact with the terminal end of the arm 42 thereby closing the switch. When the parts are in the position shown in Figure 2 the lug 45 will be removed from the arm 43 and the latter will then assume a position by its own resiliency withdrawn from the arm 42. When, therefore, the device is in the set state, as in Figure 2, the switch will be open; and when the mechanism is tripped, as shown in Figure 3, the switch will be closed.

The electrical circuit through which this knock-off mechanism is controlled and actuated is illustrated in Figure 4. The circuit comprises a source of electrical energy in the form of a transformer 46, the secondary coil 47 of which is an element of a primary grounded circuit which includes the magnet 32, a resistor 48 in series with the magnet, and a signal lamp 49 which is shunted by a resistor 51. This primary circuit also includes the normally open switch 41 in parallel with the resistor 48.

The circuit also includes a grounded detector circuit in parallel with the coil magnet 32, the detector circuit including a plurality of normally open detector switches, 52 to 56 inclusive, which are in parallel with each other. Each of the switches 52 to 55 inclusive, in its individual parallel circuit, is in series with a signal lamp 57 and a lamp shunting resistor 58; and the switch 56 is in series solely with a resistor 59. As previously described the magnet 32 is normally energized, and normally also the switch 41 will be open as well as the several detector switches. The current will then pass solely through the magnet circuit including the resistor 48, the lamp 49 and the shunting resistor 51. The sum of the individual resistances in this circuit, and the reactance of the coil 32, relative to the secondary voltage of the transformer limits the current to a point below that required by the lamp 49 so that the lamp will be extinguished.

Upon closing of one of the detector switches, current will be diverted from the magnet 32 through the detector circuit and this diversion will be sufficient to effect release of the armature 33 and subsequent and consequent tripping of the knock-off device as described above. The switch 41, normally open, will now be closed by action of the lug 45 on the collar 7 of the knock-off device. Closing of the switch 41 has the effect of diverting the current through the detector circuit which has a relatively low total resistance as compared with the resistance of the magnet coil 32 and resistor 48. The current flow through the lamp 49 is thereby increased to the point where the lamp is lighted to indicate that the stop motion has been tripped. When the fault detected by the actuated detector has been fixed and the detector switch has been opened, sufficient current will be supplied to the magnet to allow the knock-off device to be reset, thereby simultaneously reopening the switch 41. The lamp 49 will now be extinguished pending subsequent tripping of the knock-off.

The embodiment of the device illustrated in Figures 5 to 7 inclusive is in the main structural features identical with that described above. In this case, however, means is provided for latching the elements of the device in the operative or set positions when the electro-magnet is de-energized instead of the reverse as in the previously described embodiment. In this case, therefore, the armature 61 of the electro-magnet carries a rigid arm 62 which when the armature is in the released position, as shown in Figure 6, will occupy a position behind the flange 63 of the lever 64, this latter lever corresponding to the lever 23 of the previously described embodiment and the flange 63 corresponding to flange 31 of the lever 23. While, therefore, the solenoid magnet 65 is de-energized the parts will be locked in their operative positions, as illustrated in Figure 6; and when the magnet 65 is energized the armature 61 will be moved to an extent freeing the flange 63 from the arm 62 so as to release the arm 64 and to permit the knock-off spring 66 to actuate the knock-off in accordance with the principle set forth above.

In this case the knock-off unit comprises two electric switch devices consisting respectively of the spring fingers 67 and 68. When the device is in operative condition as shown in Figure 6, a lug 69 on the shaft collar 71 will engage the element 68 and will ground this element. At this time finger 67 will have no electrical contact with any part of the box structure. When, however, the device has been tripped the shaft will have rotated into a position where the lug 69 will leave the finger 68 and will engage the finger 67 thereby grounding the latter finger.

The circuit associated with this embodiment is illustrated in Figure 8. In this case, the secondary coil 73 of the transformer 74 is connected at one side to the grounded detector circuit which embraces the parallel detector switches 75, 76, 77, 78 and 79, and at the other side to a primary circuit which includes the electro-magnet 65 and the switch 68. This latter circuit also includes a signal lamp 81 in parallel with the switch 68 and magnet 65, and a resistor 82 which, through the switch 67, may be connected through a grounded line in parallel with the magnet circuit described above.

When the knock-off mechanism is in the set or operative state, as shown in Figure 6, the switch 67 will be open and the magnet 65 will be de-energized because of the normally open detector switches in the circuit of the secondary coil 73. The switch 68 is closed so that the closing of any one of the detector switches will result in energization of the magnet 65 and resulting tripping of the knock-off device. In this actuation of the knock-off the switch 68 will be opened and a grounded circuit formed containing the secondary coil 73, the closed detector switch and its associated series resistor, and the lamp 81. At the same time the switch 67 will be closed to form a shunt circuit across the secondary coil 73 containing the resistor 82 thereby compensating the loss of the magnet 65 in the closed detector circuit and in the circuit of the lamp 81 and precluding excessive flow of current therein.

I claim:

In an electric stop motion, a normally energized primary circuit including a source of electrical energy and an electro-magnet for control of said motion, a resistor in series with said magnet, and a shunt for said resistor containing a normally open shunt-control switch, a detector circuit in shunting relation with said magnet and containing a normally open detector switch, and means operatively connecting the first named switch with the magnet for actuation of the switch to closed position when the said magnet is shunted by said detector.

References Cited in the file of this patent

UNITED STATES PATENTS

| | | |
|---|---|---|
| 821,672 | Richards | May 29, 1906 |
| 1,208,863 | Waldow | Dec. 19, 1916 |
| 1,682,634 | Schwab | Aug. 28, 1928 |
| 1,989,524 | Moore | Jan. 29, 1935 |
| 2,220,612 | Oshei | Nov. 5, 1940 |
| 2,443,122 | Smith | June 8, 1948 |
| 2,454,189 | Lentjes | Nov. 16, 1948 |
| 2,488,614 | Antonevich | Nov. 22, 1949 |
| 2,604,790 | Derby et al. | July 29, 1952 |